US006533239B1

United States Patent
Komuro et al.

(10) Patent No.: US 6,533,239 B1
(45) Date of Patent: Mar. 18, 2003

(54) METAL MOLD FOR MANUFACTURING A SLIDER FOR A SLIDE FASTENER

(75) Inventors: Susumu Komuro, Toyama-ken (JP); Hiroo Minami, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/427,607

(22) Filed: Oct. 27, 1999

Related U.S. Application Data

(62) Division of application No. 08/992,181, filed on Dec. 17, 1997, now Pat. No. 5,991,981.

(30) Foreign Application Priority Data

Dec. 27, 1996 (JP) .............................................. 8-349807

(51) Int. Cl.[7] .................................................. B29D 5/00
(52) U.S. Cl. ........................ 249/142; 425/814; 164/342
(58) Field of Search ........................ 249/142; 425/814; 29/409; 164/340, 342

(56) References Cited

U.S. PATENT DOCUMENTS

| 1,681,550 A | | 8/1928 | Marinsky ..................... 24/429 |
|---|---|---|---|
| 2,160,160 A | | 5/1939 | Marinsky et al. ............. 24/429 |
| 2,181,142 A | | 11/1939 | Marinsky ..................... 24/429 |
| 2,209,413 A | * | 7/1940 | Marinsky .................... 249/142 |
| 2,519,171 A | * | 8/1950 | Bolten, Jr. ................... 349/63 |
| 2,575,187 A | | 11/1951 | Schaye ........................ 24/418 |
| 2,705,345 A | * | 4/1955 | Epple ........................ 249/142 |
| 2,775,027 A | | 12/1956 | Morin ......................... 29/408 |
| 4,525,903 A | | 7/1985 | Ishii ............................ 24/429 |
| 4,790,973 A | * | 12/1988 | Minami et al. ............. 264/242 |
| 5,698,243 A | * | 12/1997 | Wakabayashi .............. 425/545 |
| 6,094,786 A | * | 8/2000 | Wakabayashi ................ 24/429 |

FOREIGN PATENT DOCUMENTS

| EP | 0 079 059 | 5/1983 |
|---|---|---|
| EP | 0 090 371 | 10/1983 |
| EP | 0 282 987 | 9/1988 |
| EP | 0 374 577 | 6/1990 |
| EP | 0 604 695 | 7/1994 |
| FR | 825 580 | 3/1938 |
| FR | 2 272 621 | 12/1975 |

OTHER PUBLICATIONS (1) English Abstract for French patent 825 580.

* cited by examiner

Primary Examiner—Jan H. Silbaugh
Assistant Examiner—Donald Heckenberg
(74) Attorney, Agent, or Firm—Finnegan, Henderson, Farabow, Garrett, and Dunner, L.L.P.

(57) ABSTRACT

A metal mold for molding a slider of a slide fastener is provided. The metal mold comprises upper and lower mold cavities for molding portions of the slider, with the upper and lower molds moving up and down relative to each other in order to open and close the mold. The mold further comprises at least two sliding molds for molding portions of the slider not molded by the upper and lower molds. The sliding molds are capable of being removably introduced into the upper and lower molds from their front and rear sides when the upper and lower molds are in tight contact with each other.

6 Claims, 5 Drawing Sheets

METAL MOLD FOR MANUFACTURING A SLIDER FOR A SLIDE FASTENER

This is a divisional of application Ser. No. 08/992,181, flied Dec. 17, 1997, now U.S. Pat. No. 5,991,981, incorporated herein by reference.

BACKGROUND OF THE INVENTION

1. Field of the Invention

This invention relates to a slider of a slide fastener comprising a slider body and a lug molded integrally by die casting, to which a pull tab is secured subsequently. It also relates to a metal mold for molding the same.

2. Prior Art

A slider of a slide fastener of the type under consideration has to be securely combined with a pull tab in a later stage of manufacturing. For securing a pull tab to the slider, a ring of the pull tab is introduced into the space between the arched lug and the slider body through the gap between a rear pillar of the lug and an upper wing of the slider body and then a front pillar of the lug is plastically deformed and bent toward the upper wing typically by means of a pincher. Thus, a slide fastener of this type can be realized by combining a slider body and a pull tab selected from a variety stocks to meet the demand of the consumer.

Meanwhile, a metal mold for producing a slider of the above identified type comprises an upper mold for defining the profile of the upper half of the upper wing and that of the lug, a lower mold for defining the profile of the lower half of the lower wing and an intermediary mold for defining the profiles of the remaining portions of the upper and lower wings and a so-called diamond section (guide post) as typically described in Japanese Utility Model Application Laid-Open No. 2-12889, of which the upper and lower molds include respective first and second (left and right) mold halves, whereas the intermediary mold includes first and second (front and rear) mold halves.

The lower mold has an U-shaped cross section with a groove formed at the center, into which the intermediary mold is placed. The first and second mold halves of the intermediary mold can slide back and forth between the upper and lower molds, whereas the first and second mold halves of the upper and lower molds can be moved laterally to open and close the mold assembly.

Known sliders of the type under consideration are accompanied by a drawback that, when the pull tab is brought into the space between the lug and the slider body and the front pillar is bent down for plastic deformation in order to securely anchor the pull tab, the front pillar can give rise to a fissure. It is very difficult to completely prevent such a fissure from taking place even if a rigorous quality control system is in place because of variations in the molded material and the molding conditions. Additionally, if the front pillar is properly deformed, there can occur a spring back phenomenon in it to produce a significant gap between the upper surface of the upper wing and the rear pillars. If the front pillar is bent downward with enhanced pressure to eliminate the gap, then not only can the front pillar be damaged but it can press to the upper surface of the upper wing at the lower end to deform the latter and damage the internal passage for the elements of the fastener and hence the commercial value of the fastener.

Meanwhile, known metal molds for molding sliders of the type under consideration comprise quite a number of components that have to be machined accurately to raise the manufacturing cost of the mold, while such a mold cannot be used for molding a large number sliders because of its durability. Additionally, each of the components is required to operate in a complex manner with timings that can be very complicated. Thus, the net result will be a high manufacturing cost of the fastener.

In view of these circumstances, it is therefore an object of the present invention to provide a quality slider for a slide fastener that is free from the above identified problems including the possible damage of the lug that can occur when the front pillar of the lug is pressed and deformed, the problem of spring back and that of a deformed upper wing and also to provide a metal mold for molding sliders of slide fasteners that has a simple structure and can be used for manufacturing a large number of sliders at low cost to improve the productivity.

SUMMARY OF THE INVENTION

According to the invention, the above objects and other objects of the invention are achieved by providing a slider for a slide fastener comprising a body including an upper wing and a lower wing linked together by a diamond section (guide post) and a lug secured to the upper surface of the upper wing. The lug is integrally molded with the body by die casting. The lug is arched and at least has a front pillar securely and integrally held to the upper surface of a front portion of the upper wing. Between the rear end of the lug and the upper surface of the upper wing, a gap is provided for allowing the ring of a corresponding pull tab to pass therethrough. There is also provided a pair of rear lateral members arranged for supporting the lug at the rear end thereof.

In a slider according to the invention, the rear lateral members of the lug may be rear lateral legs extending downward from the oppositely disposed lateral sides at the rear end of the lug. Alternatively, they may be laterally arranged rear pillars projecting upward from a central area of the rear end of the upper surface of the upper wing. Preferably, the lug has an engaging portion formed at the rear end of its main body for engagement with the top ends of the rear lateral pillars projecting upward from the upper wing.

When the rear lateral members of the lug are rear lateral legs extending downward from the oppositely disposed lateral sides at the rear end of the lug, they provide an advantage of preventing the upper wing from being deformed and damaged if the lug is subjected to strong pinching force for the above described plastic deformation; because the lateral legs are deformed firstly to absorb any excessive pinching force. More specifically, the rear lateral legs will be swerved sideways so that, once the lug springs back, they may elastically restore the original positions and their lower ends may come into contact with the upper surface of the upper wing to eliminate any gap that may have been formed between the lower ends of the legs and the upper surface of the upper wing.

When the rear lateral members of the lug are laterally arranged rear pillars projecting upward from a central area of the rear end of the upper surface of the upper wing, the elastic deformation can be minimized because the rear end of the lug does not have to be held in close contact with the top ends of the rear lateral pillars.

In a preferred mode of carrying out the invention, the lug has one or more than one ribs extending longitudinally in a central area of a lower surface thereof. The one or more than one ribs projecting downward from the lower surface of the lug operate effectively for reinforcing the front pillar and the main body of the lug. Additionally, the ribs minimize the contact area between the pull tab and the lower surface of the lug when the pull tab is pulled to scrape the lug's lower surface and hence protect the lower longitudinal edges of the lug against being scraped off so that the pull tab may always be operated smoothly with regard to the lug.

Preferably, a longitudinal groove is formed in a central area of the upper surface with a profile matching that of the ring of the pull tab, extending from the front pillar of the lug to the rear end of the slider body. When the lug has rear lateral legs extending downward from the oppositely disposed lateral sides at the rear end of the lug, the groove serves to facilitate the operation of introducing the ring of the pull tab into the space between the arched lug and the slider body through the gap between the rear lateral lugs of the lug and the upper wing.

With a slider having the above described figure, the rear end of the lug is plastically deformed to bend toward the rear end of the upper wing in order to securely hold a pull tab in position after introducing the pull tab through a gap between the lug and the upper wing.

A slider comprising a lug as an integral part can be manufactured at low cost by means of a metal mold according to the invention and having a structure as described below.

According to the invention, there is provided a metal mold for molding a slider of a slide fastener by die casting to integrally produce a pair of oppositely disposed upper and lower wings and a lug secured to the upper surface of the upper wing. The metal mold comprises an upper mold, a lower mold and two or more sliding molds. The upper mold has a cavity for integrally molding part of the lug except the rear lateral legs and part of the upper wing to define the profile of the upper and lateral surface of the lug and part of the upper surface of the upper wing. The lower mold has a cavity for molding part of the lower wing to define the profile of the lower surface of the lower wing and adapted to move up and down in order to come into contact with the upper mold and leave the latter in an alternating manner. The two or more than two sliding molds have an internal profile adapted to mold the remaining portions of the upper and lower wings and of the lug not molded by the upper and lower molds. They are removably introduced between the closely held upper and lower molds from front and rear sides. The cavity defined by the upper mold and the sliding mold for molding the rear lateral members has a substantially inverted U-shaped cross section. In a metal mold according to the invention, the sliding mold for defining an lower surface of the lug has one or more than one rib forming grooves extending longitudinally on the upper surface thereof.

Alternatively, at least either one of the upper and lower molds may be divided into two front and rear halves, at least one of which is adapted to move back and forth. Preferably, in a metal mold according to the invention, the sliding mold has a bulged section for forming a groove in a central area of the upper surface of the upper wing with a profile matching that of the ring of the pull tab, extending from the front pillar of the lug to the rear end of the slider body so that the ring of the pull tab may be introduced with ease through the gap between the lug and the upper wing.

According to another aspect of the invention, if a metal mold according to the invention is used for molding rear lateral pillars projecting upward from the upper surface of the upper wing, the portion of the sliding mold for forming rear lateral members of the slider has a substantially T-shaped cross section.

With a metal mold according to the invention and having a structure as described above, the molding operation typically proceeds in a manner as described below. Once the molding material filled in the metal mold is set, the plurality of sliding molds are moved in predetermined respective directions and then upper and lower molds are moved upward and downward respectively to open the metal mold. Then, the slider body having a lug remains either in the upper mold or in the lower mold. Then, an eject pin is operated to project into the cavity and move out the molded product from the mold. If a number of slider bodies with lugs are simultaneously molded in a single molding process, they are separated from each other by appropriate known separation means. Finally, a pull tab is fitted to each of the slider body with a lug that may or may not have been secured to a fastener tape.

DESCRIPTION OF THE PREFERRED EMBODIMENTS

Figure 1:
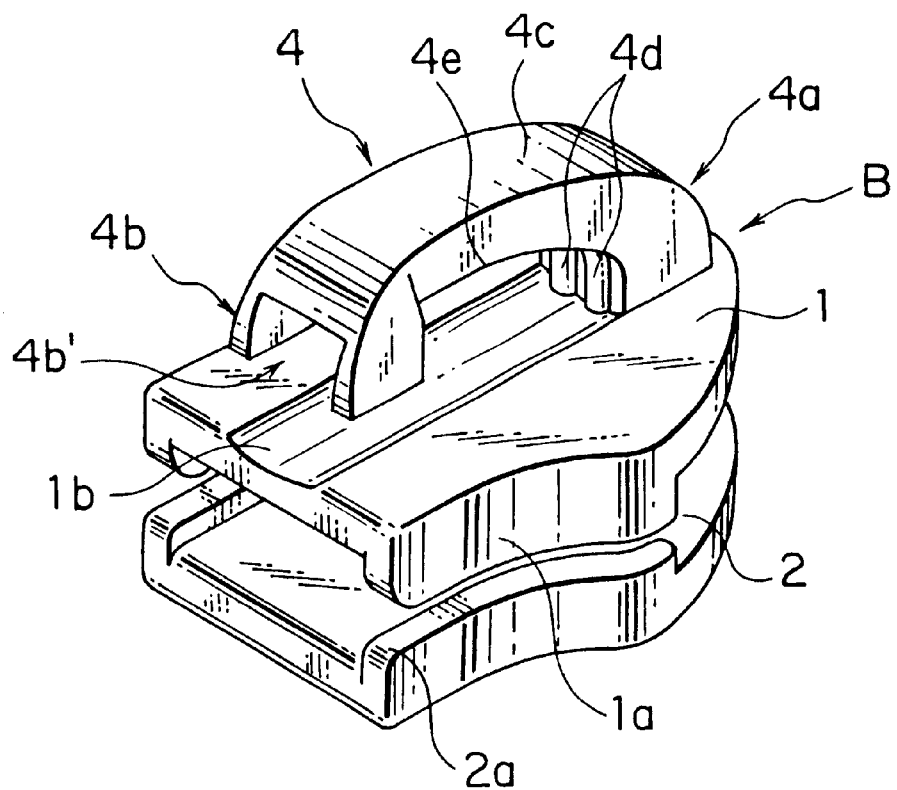
FIG. 1 is a schematic perspective view of an embodiment of slider body of a slide fastener provided with a lug according to the invention.
Figure 2:
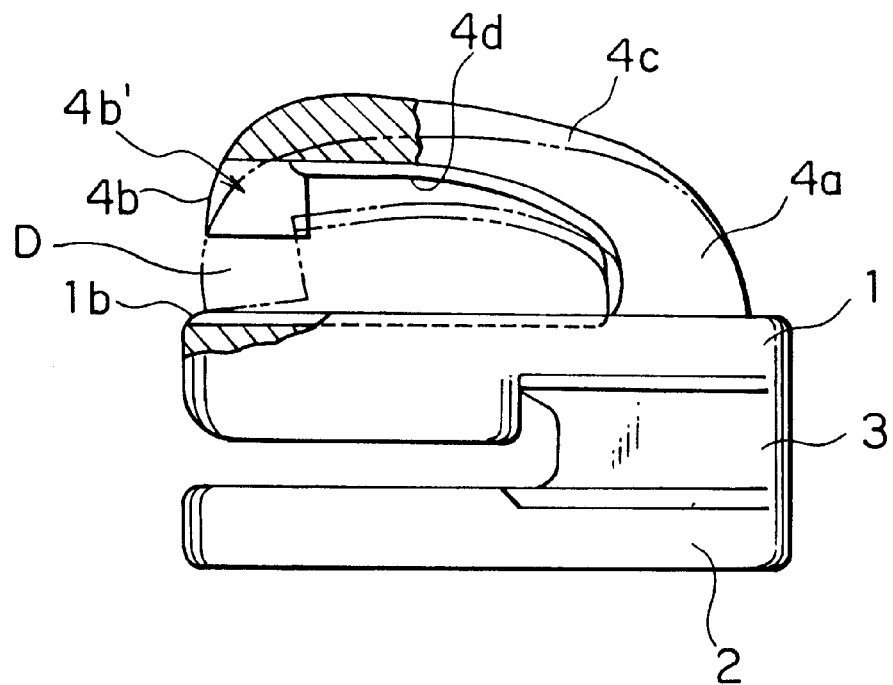
FIG. 2 is a partly cut-away schematic lateral side view of the embodiment of FIG. 1.

Now, the present invention will be described by referring to the accompanying drawings that illustrate preferred embodiments of the invention, although the present invention is not limited thereto by any means. FIGS. 1 through 4 illustrate an embodiment of slider body B of a slide fastener in which a pull tab is to be installed. As shown, it comprises an upper wing 1, a lower wing 2, a diamond section (guide post) 3 for connecting the upper and lower wings 1 and 2 at the front end thereof and a lug 4.

The upper and lower wings 1 and 2 have respective lateral flanges 1a and 2a extending from the rear end to a middle portion thereof to define a substantially Y-shaped engaging element guide path between the upper and lower wings 1 and 2. The lug 4 has a front pillar 4a and rear lateral legs 4b, 4b to show a substantially arch-shaped profile, of which the front pillar 4a is integrally formed with the upper wing 1 on a front area of the upper surface of the upper wing 1, whereas the lower ends of the rear lateral legs 4b, 4b are separated from the upper surface of the upper wing 1 when the slider body is taken out of the metal mold so that a ring 5a of a pull tab 5 may be made to pass through the gap D defined by the legs 4a, 4b and the upper wing 1.

The lug 4 has a structure as described below to characterized the present invention.

Figure 5:
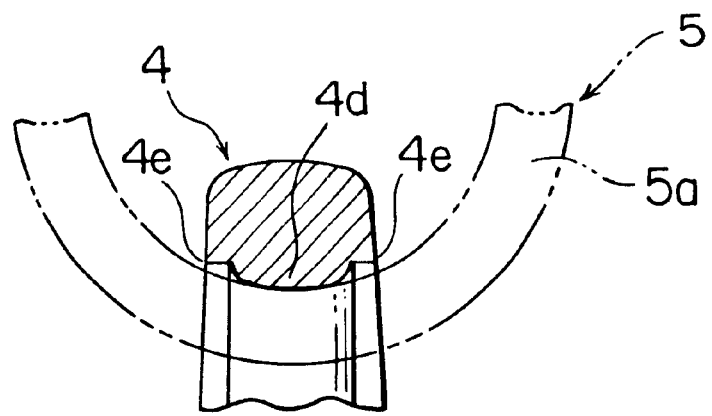
FIG. 5 is a schematic cross sectional view of part of a slider body obtained by modifying the embodiment of FIG. 1.

Firstly, the rear lateral legs 4b, 4b extend downward respectively from the oppositely disposed lateral sides at the rear end of the lug main body 4c to define a space 4b' extending longitudinally, said rear lateral legs 4b, 4b being separated at the lower ends thereof from the upper surface of the upper wing 1. A pair of longitudinal ribs 4d, 4d are arranged in parallel with each other on the lower surface of the lug 4 and extend from the lower end of said front pillar 4a to the rear lateral legs 4b, 4b, said ribs 4d, 4b having a semicircular cross section. Additionally, a groove 1b having an arcuate cross section is formed at the center of the upper surface of the upper wing 1 and extends from said front pillar 4a to the rear end of the upper wing 1. While the groove 1b has an arcuate cross section in FIG. 1, it may have any other cross sectional profile so long as it is adapted to match part of the profile of the ring 5a of the pull tab 5. The number of ribs 4d, 4d is not necessarily two and they may be replaced by a single rib as shown in FIG. 5. If such is the case, the rib shows a wide and semielliptic cross sectional view.

Then, the ring 5a of a pull tab 5 is introduced into the space between the lug 4 and the upper wing 1 through the gap D formed between the lower ends of the rear lateral legs 4b, 4b and the upper surface of the upper wing 1 of the slider body B of a slide fastener provided with a lug and having a structure as described above. Subsequently, the top of the front pillar 4a and the lower surface of the lower wing 2 are pressed against each other typically by means of a pincher to bend the front pillar 4a backward and plastically deformed until the lower ends of the rear lateral legs 4b, 4b abut the upper surface of the upper wing 1 at a rear end area thereof to close the gap D. However, it may be expected that a slight gap is reproduced there as the front pillar 4a springs back, if to a small extent. However, with the profile of the rear lateral legs 4b, 4b of the lug 4 according to the invention, the lower ends of the rear lateral legs 4b, 4b are tightly held in contact with the upper surface of the upper wing 1 at a rear end area thereof to completely close the gap D and finish the operation of assembling the slider of the slide fastener because of the remarkable effect of the rear lateral legs 4b, 4b as will be described in greater detail hereinafter.

The ribs 4d, 4d projecting downward from the lower surface of the lug 4 operate to reinforce the front pillar 4a and the lug main body 4c so that no damage such as a fissure may be given rise to if the front pillar 4a is subjected to excessively strong pinching force. Additionally, the ribs 4d, 4d effectively prevent the pull tab 5 from contacting both of lateral edges 4e, 4e of the lower surface of the lug 4 at a time to ensure a smooth sliding operation of the pull tab 5 relative to the lug 4. It will be appreciated that, if the lug is not provided with such ribs 4d, 4d, the pull tab 5 can easily scrape and damage the edges 4e, 4e of the lower surface of the lug 4 so that the plating of the lug 4 and the pull tab 5 can easily come off at the cost of the esthetic appearance of the slide fastener.

If the rear lateral legs 4b, 4b of the lug 4 are replaced by a conventional solid leg, the lower end of the solid leg will fiercely press the upper surface of the upper wing 1 to consequently deform the thin upper wing 1, if partly, and produce a recess that downwardly projects to interfere with a smooth sliding motion of the slider, when the lug 4 is subjected to strong pinching force. To the contrary, with the rear lateral legs 4b, 4b of the lug 4 according to the invention and having the above described structure, the rear lateral legs 4b, 4b are deformed to absorb any excessive pinching force applied to the lug 4 before the upper wing 1 is deformed. More specifically, the rear lateral legs 4b, 4b are typically swerved sideways so that they restore the respective original positions as the lug 4 springs back and consequently compensate the lift that may have been undesirably given rise to by the sprung back lug 4. Thus, the lower ends of the rear lateral legs 4b, 4b will be tightly held in contact with the upper surface of the upper wing 1.

Figure 3:
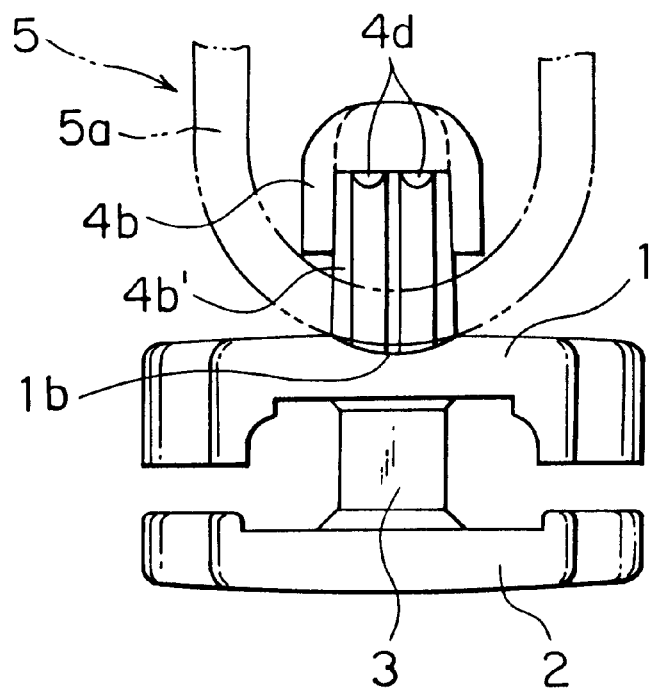
FIG. 3 is a schematic front view of the embodiment of FIG. 1, illustrating how a pull tab is installed therein.
Figure 4:
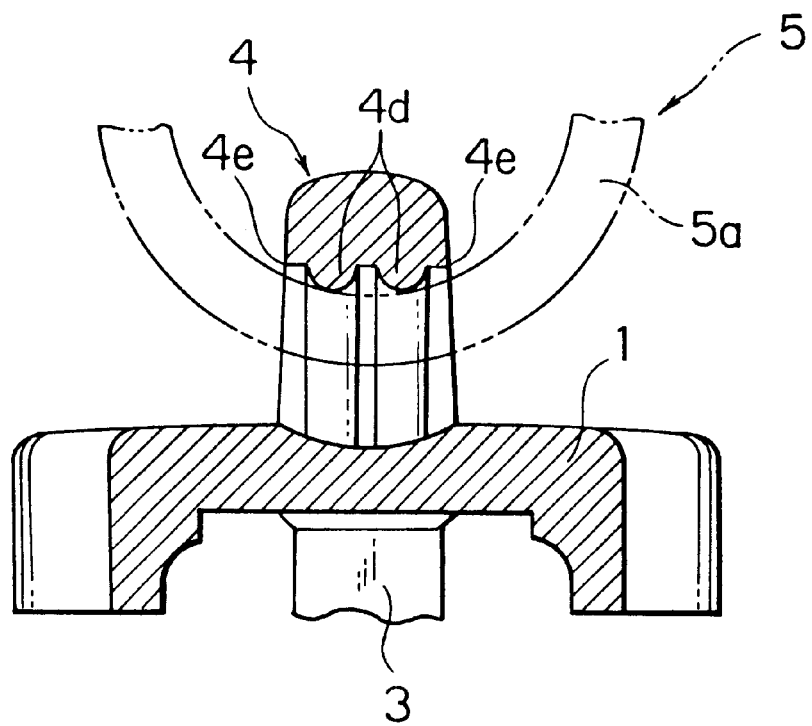
FIG. 4 is a schematic cross sectional view of the embodiment of FIG. 1, illustrating how the pull tab and the lug are slidingly moved relative to each other.

Meanwhile, the groove 1b formed on the upper surface of the upper wing 1 facilitates the insertion operation of the ring 5a of the pull tab 5 through the gap D between the upper surface of the upper wing 1 and the lower ends of the rear lateral legs 4b, 4b of the lug 4 as will be appreciated by referring to FIG. 3.

A metal mold according to the invention is advantageously used for molding the slider body B of a slide fastener integrally with a lug 4.

Figure 6:
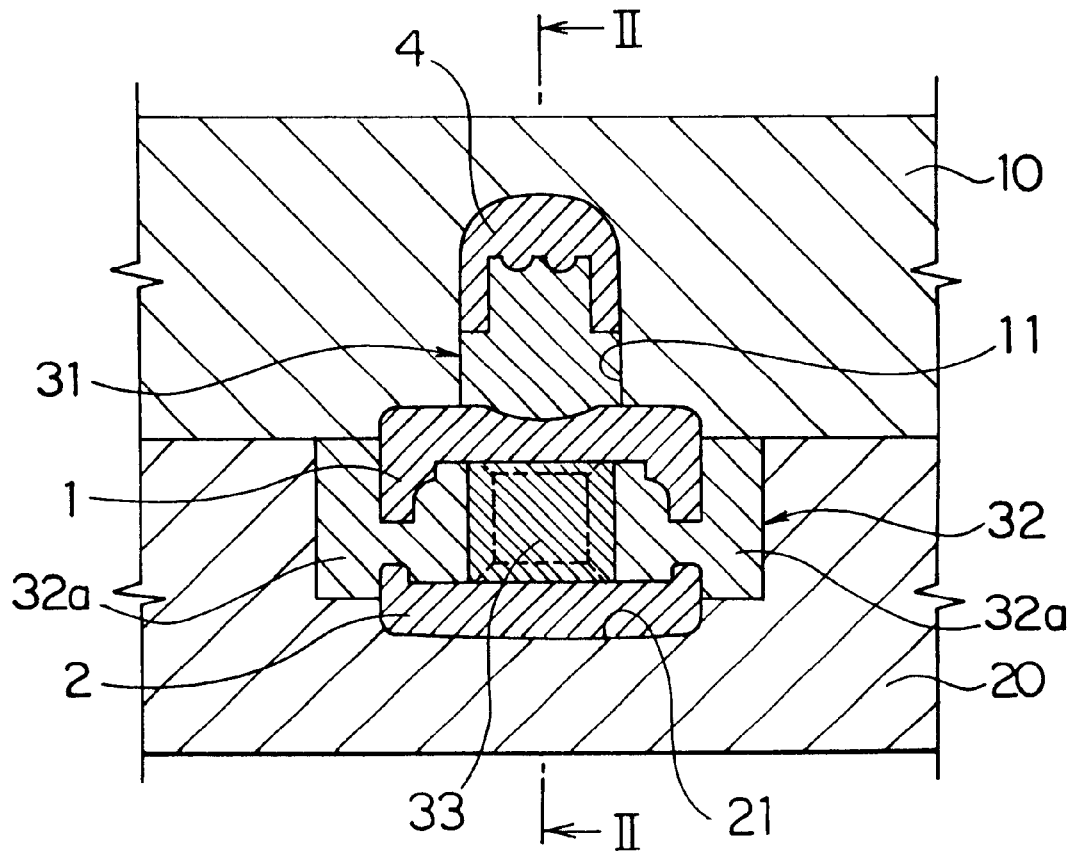
FIG. 6 is schematic lateral cross sectional view of an embodiment of metal mold for molding the above embodiment of slider body according to the invention, the metal mold being in a closed state.
Figure 7:
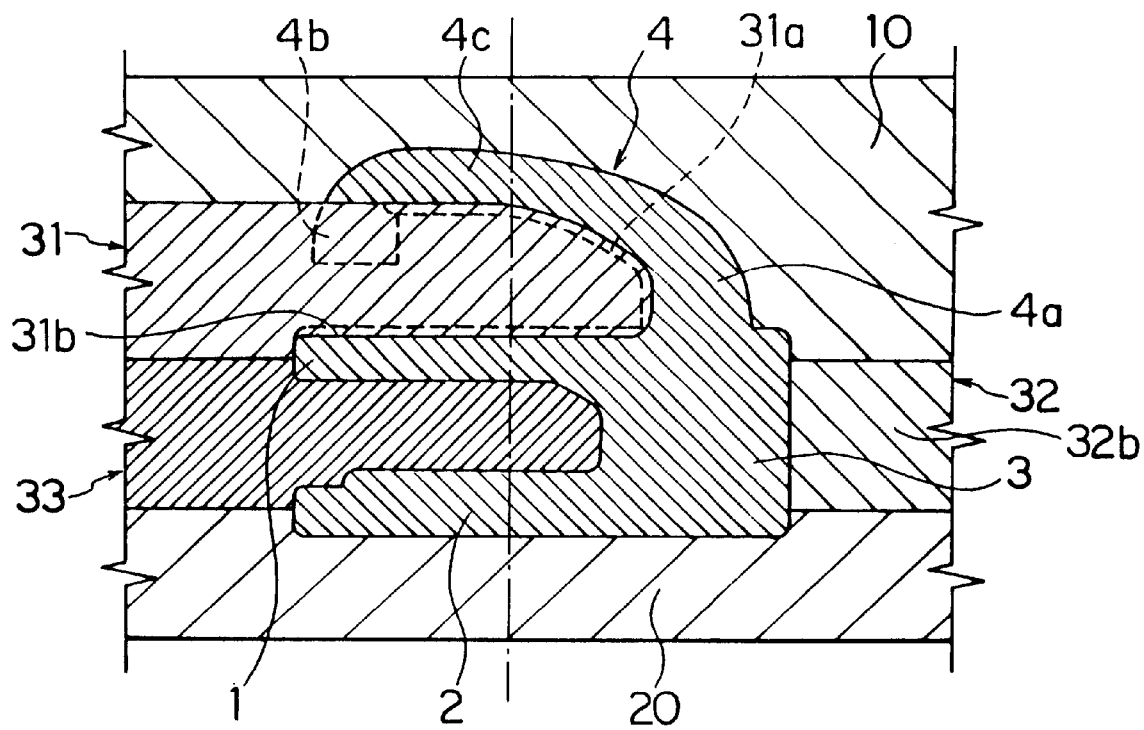
FIG. 7 is a schematic cross sectional view of the embodiment of FIG. 6 taking along line II—II.

FIGS. 6 and 7 show a typical embodiment of metal mold according to the invention, although the figure of a metal mold according to the invention is by no means limited thereto. For example, each of the upper and lower molds 10 and 20 may be divided into two halves as indicated by phantom line in FIG. 7. With such an arrangement, all the molds can be operated by moving horizontally to allow the used of a simplified drive mechanism.

The embodiment of metal mold according to the invention for integrally molding a slider body B and a lug 4 comprises an upper mold 10, a lower mold 20 and first through third sliding molds 31, 32 and 33 arranged between the upper and lower molds 10 and 20.

The upper mold 10 is provided with a cavity 11 having a substantially inverted T-shaped cross section to define the profile of the upper end of the diamond section (guide post) 3 of the slider body B, that of lateral shoulders of the upper wing 1 and that of the upper surface and the lateral sides of the lug 4. On the other hand, the lower mold 20 is provided at the bottom thereof with a cavity 21 having a substantially U-shaped cross section to define the profile of the lower surface of the lower wing 2. The first sliding mold 31 is designed to define the profile of the underside of the lug 4 and that of the upper middle portion of the upper wing 1.

Thus, referring to FIGS. 6 and 7, the first sliding mold 31 is responsible for molding from the rear end of the upper wing 1 all the way to the rear side of the front pillar 4a of the lug 4 and has a substantially inverted T-shaped cross section at the portion for molding the rear lateral legs 4b, 4b as seen from FIG. 6 so that a cavity having a substantially inverted U-shaped cross section is defined between the portion of the sliding mold 31 for molding the rear lateral legs 4b, 4b and the upper mold 10 as shown in FIG. 6. As seen from FIG. 7, the sliding mold 31 has a profile running along the lower surface of the lug 4 and the longitudinal center line of the upper surface of the upper wing 1. Additionally, the sliding mold 31 has a pair of grooves 31a, 31a for molding the ribs 4d, 4d running in parallel with each other on the lower surface of the lug 4 and a bulged section 31b for molding the groove 1b (see FIG. 1) on the upper surface of the upper wing 1, said bulged section 31b having a cross sectional view corresponding to the arcuate cross section of the groove 1b.

The second sliding mold 32 comprises a pair of lateral blocks 32a, 32a and a base section 32b that produce a U-shaped cavity altogether and is responsible for defining the profile of the outer lateral sides and that of the oppositely disposed inner surfaces of the upper and lower wings 1 and 2 except a central portion of each of them as well as the profile of the front end of the diamond section (guide post) Finally, the third sliding mold 33 is responsible for defining the profile of the oppositely disposed inner surfaces of a central portion of the upper wing 1 and that of lower wing 2 except the rear ends thereof along with the profile of the lateral sides and the rear end surface of the diamond section (guide post) 3.

As shown in FIGS. 6 and 7, the upper and lower molds 10 and 20 are brought into tight contact with each other and then the first and third sliding molds 31 and 33 are arranged one on the other and inserted into a cavity formed by the upper and lower molds 10 and 20 from its rear end. Then, the second sliding mold 32 is inserted into the cavity also formed by the upper and lower molds 10 and 20 from its front end to produce a cavity for integrally molding the slider body B and the lug 4 of the above embodiment. Note that a runner (not shown) is formed through the upper mold 10 and open to the upper cavity 11 for introducing the molding material typically containing a zinc alloy into the cavity, whereas the lower mold 20 is provided with a vertically arranged eject pin (not shown) that can move into and away from the lower cavity 21 of the lower mold 20. While not shown, a plurality of molding cavities, each of which is identical with the above described cavity, are normally arranged in a single mold and the runner is branched to supply the molding material to each of the cavities.

The molding cavity of FIGS. 6 and 7 is filled with the molding material for forming a slider body B and a lug 4. Once the material is set under this condition, the first sliding mold 31 and the third sliding mold 33 are moved backward (leftward in FIG. 7) and the second sliding mold 32 is moved forward (rightward in FIG. 7). Subsequently, the upper and lower molds 10 and 20 are moved upward and downward respectively to open the molds 10 and 20 and expose the molded slider body B with the lug 4 placed in the cavity of the lower mold 20. Then, the eject pin (not shown) is operated and projected into the cavity 21 to move the molded product out of the metal mold. Thereafter, a plurality of identical slider bodies B produced with respective lugs 4, are separated from each other by known separating means. Finally, a pull tab 5 is fitted to each of the slider body B with a lug 4 that may or may not have been secured to a fastener tape.

Figure 8:
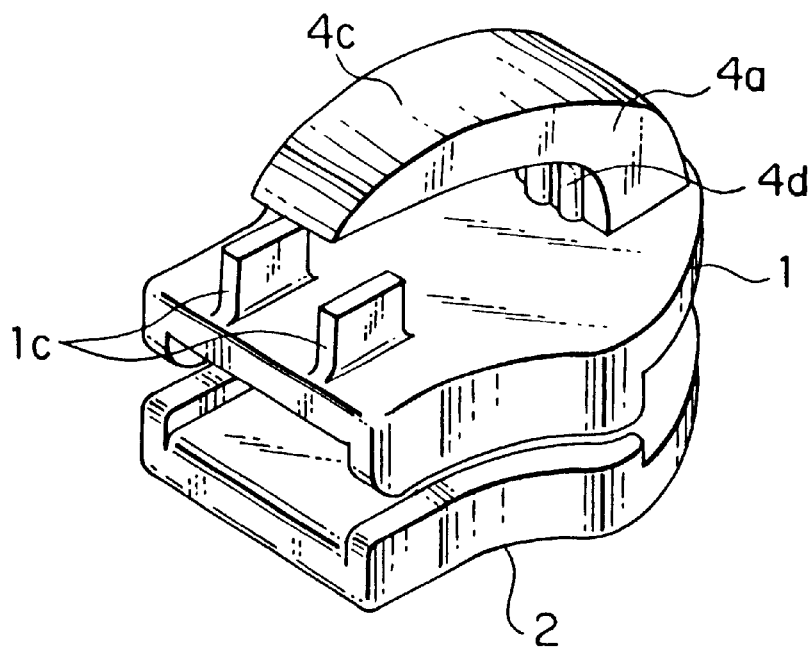
FIG. 8 is a schematic perspective view of another embodiment of slider according to the invention.
Figure 9:
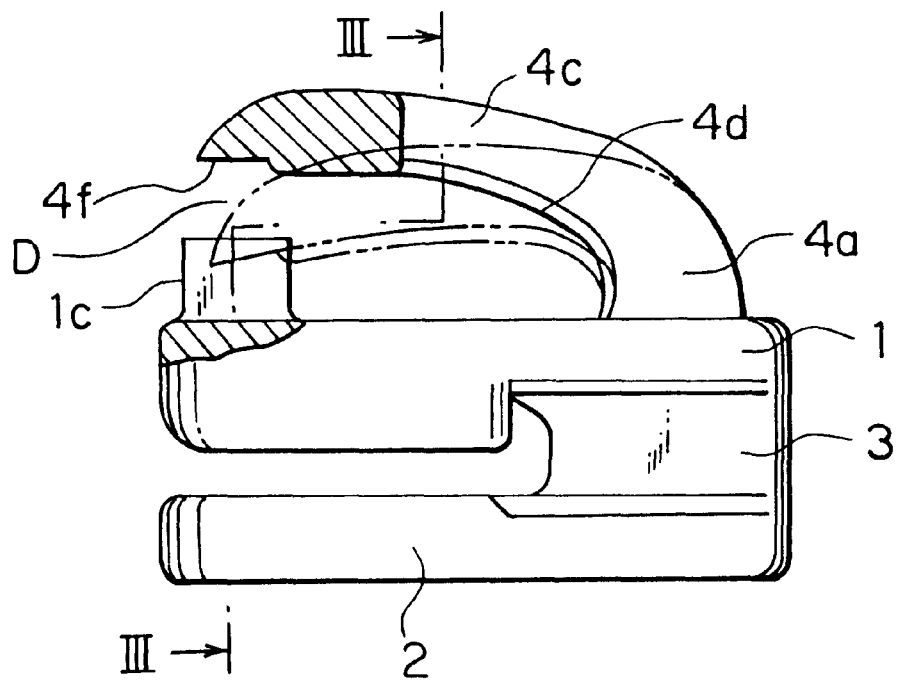
FIG. 9 is a schematic lateral side view of the embodiment of FIG. 8.

FIGS. 8 and 9 shows another embodiment of slider according to the invention.

Referring to FIGS. 8 and 9, this second embodiment differs from the first embodiment in that the rear lateral legs 4b, 4b suspended from the rear end of the lug 4 are replaced by rear lateral pillars 1c, 1c projecting upward from the upper wing 1 at the rear end thereof to eliminate the rear lateral legs 4b, 4b. With this arrangement, the gap D for allowing a pull tab 5 to pass through is located between the rear end of the main body 4c of the lug 4 and the tops of the rear lateral pillars 1c, 1c standing from the upper wing 1. Additionally, an engaging portion 4f is formed in a rear end portion of the lower surface of the lug 4 for engagement with the tops of the rear lateral pillars 1c, 1c.

With this arrangement of the second embodiment, unlike the first embodiment, partly because the engaging portion 4f is formed at the rear end of the lug 4, the rear end of the main body 4c of the lug 4 does not necessarily have to be brought into tight contact with the tops of the rear lateral pillars 1c, 1c after the ring 4c of a pull tab 5 is made to pass through the gap D and the lug 4 is plastically deformed so that a reduced degree of plastic deformation may be sufficient for securely holding the pull tab 5 in position. As a matter of course, the lug 4 is less liable to produce a fissure during the plastic deformation process with this arrangement.

Figure 10:
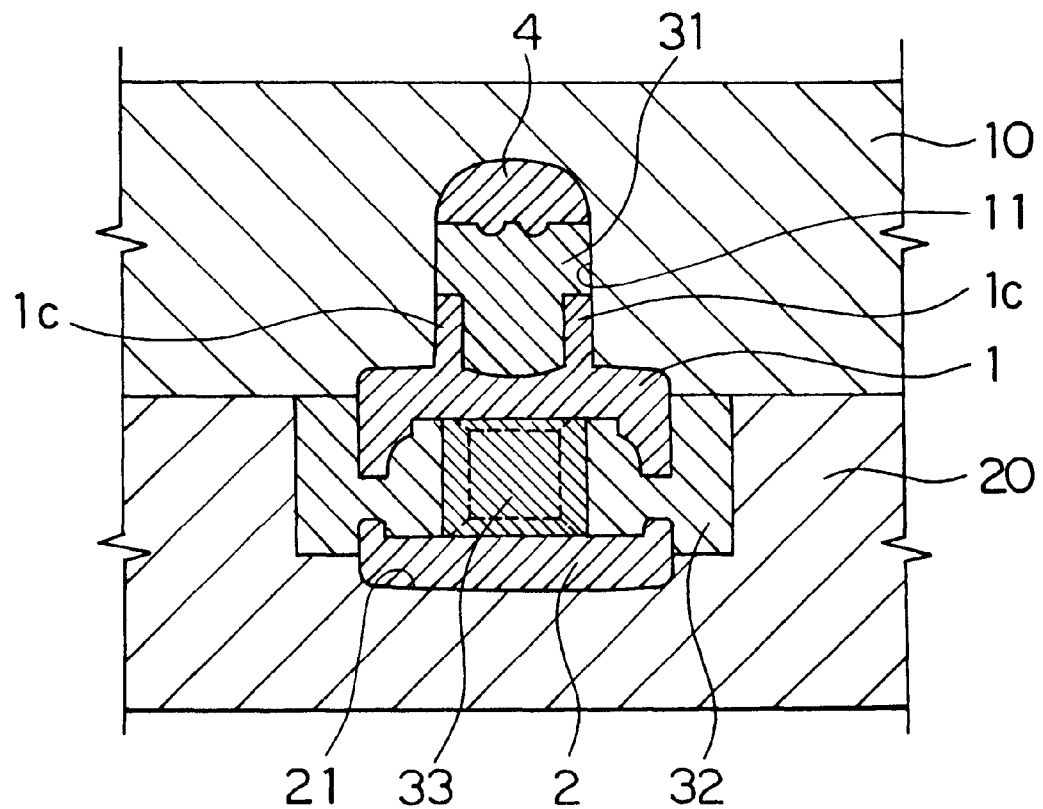
FIG. 10 is a schematic cross sectional view of another embodiment of metal mold for molding the slider body of the embodiment of FIGS. 8 and 9 taken along line III—III of FIG. 9.

FIG. 10 is a cross sectional view of a metal mold adapted to mold a slider body B with a lug according to the second embodiment of the invention. As seen from FIG. 10, the rear lateral pillars 1c, 1c can be formed without problem by using a first sliding mold 31 having a substantially T-shaped cross section at the portion corresponding to the rear lateral pillars 1c, 1c. Note that the upper mold 10 has a cavity same as that of the upper mold 10 of the first embodiment of metal mold so that this embodiment of metal mold can be realized by modifying the profile of the first sliding mold 31 of the first embodiment.

As described above in detail, a slider provided with a lug and designed to install a pull tab in a later stage of manufacturing according to the invention comprises a pair of rear lateral legs 4b projecting downward from the main body 4c of the lug 4 so that, when the ring 5a of the pull tab 5 is made to pass through the gap D between the lug 4 and the upper wing 1 and the front pillar 4a of the lug 4 is pressed toward the upper surface of the upper wing 1 for plastic deformation to close the gap D, the upper wing 1 is held free from any local deformation if excessive force is applied to the lug 4; because the rear lateral legs 4b are firstly deformed to absorb any excessive force. Additionally, while the lug 4 may be lifted slightly as it springs back when the force applied to it is released, the rear lateral legs 4b will resiliently restore the respective original positions and hence their lower ends will be tightly held in contact with the upper surface of the upper wing 1.

In case that the rear lateral legs 4b are replaced by rear lateral pillars 1c projecting upward from a rear end portion of the upper surface of the upper wing 1, partly because of the engaging portion 4f formed at the rear end of the lug 4, the rear end of the main body 4c of the lug 4 does not necessarily have to be brought into tight contact with the tops of the rear lateral pillars 1c after the ring 5a of the pull tab 5 is made to pass through the gap D and the lug 4 is plastically deformed to close the gap D so that a reduced degree of plastic deformation may be sufficient for securely holding the pull tab 5 in position. Thus, the lug 4 is less liable to produce a fissure during the plastic deformation process with this arrangement.

Additionally, longitudinal ribs 4d are arranged on the lower surface of the lug 4 to prevent the lug 4 from producing a fissure or being damaged if it is subjected to excessive force. The ribs 4d also prevent the pull tab 5 from scraping the lower lateral edges of the lug 4 so that the plating of the pull tab 5 and the lug 4 are protected against the risk of coming off and being damaged esthetically.

Further, when the upper wing 1 is provided on the upper surface with a groove 1b having a cross section corresponding to that of part of the ring 5a of the pull tab 5, said groove 1b extending from the lower rear end of the front pillar 4a and the rear end of the upper wing 1, the ring 5a of the pull tab 5 can be made to pass through the gap D between the rear lateral legs 4b and the upper wing 1 with an enhanced degree of easiness to improve the assembling efficiency.

Finally, a metal mold designed to mold a slider according to the invention has a simple structure and can be operated in a simple manner to reduce the capital cost and improve the manufacturing efficiency. A number of sliders may be manufactured simultaneously by using a metal mold according to the invention.

What is claimed is:

1. A metal mold for molding a slider of a slide fastener by die casting to integrally produce a pair of oppositely disposed upper and lower wings and a lug of which only one end is secured to an upper surface of said upper wing, wherein the metal mold comprises:

an upper mold having a cavity for integrally molding an upper surface and lateral side surfaces of the lug, except rear lateral legs of the lug, as well as part of the upper surface of the upper wing;

a lower mold having a cavity for molding part of said lower wing to define a profile of a lower surface of the lower wing, wherein said upper and lower molds are capable of moving up and down relative to each other in order to close and open the metal mold in an alternative manner; and at least two sliding molds each having a profile capable of molding the remaining portions of said upper and lower wings and of said lug not molded by the upper and lower molds, wherein a cavity formed when the upper and lower molds are in tight contact with each other has such a cross section such that the at least two sliding molds are capable of being removably introduced into the upper and lower molds from their front and rear sides.

2. A metal mold according to claim 1, wherein one of said sliding molds defines a lower surface of said lug and has one or more than one rib forming grooves extending longitudinally on its upper surface.

3. A metal mold according to claim 1, wherein one of said sliding molds has a bulged section for forming a groove in a central area of the upper surface of the upper wing with a profile matching that of a ring of a pull tub, extending from a front pillar of the lug to the rear end of the slider body.

4. A metal mold according to claim 1, wherein one of said sliding molds has a substantially T-shaped cross section at a part for forming rear lateral legs of the slider body.

5. A metal mold according to claim 1, wherein the cavity defined by said upper mold and one of said sliding molds for molding said rear lateral legs has a substantially U-shaped cross section.

6. A metal mold according to claim 1, wherein the at least two sliding molds include a first sliding mold for defining a rear face of said lug and the part of the upper surface of the upper wing confronting said rear face of the lug, and second and third sliding molds for molding engaging element guide paths of the slider.

\* \* \* \* \*